(12) United States Patent
Kotzur et al.

(10) Patent No.: US 9,674,423 B2
(45) Date of Patent: Jun. 6, 2017

(54) SURVEYING APPARATUS WITH FUNCTION FOR CALIBRATING FOCUSING OPTICAL UNIT POSITIONS TO BE SET IN A DISTANCE-DEPENDENT MANNER

(71) Applicant: LEICA GEOSYSTEMS AG, Heerbrugg (CH)

(72) Inventors: Norbert Kotzur, Altstätten (CH); Hans-Martin Zogg, Uttwil (CH)

(73) Assignee: LEICA GEOSYSTEMS AG, Heerbrugg (CH)

( * ) Notice: Subject to any disclaimer, the term of this patent is extended or adjusted under 35 U.S.C. 154(b) by 85 days.

(21) Appl. No.: 14/857,246

(22) Filed: Sep. 17, 2015

(65) Prior Publication Data

US 2016/0080638 A1 Mar. 17, 2016

(30) Foreign Application Priority Data

Sep. 17, 2014 (EP) .................................... 14185215

(51) Int. Cl.
*H04N 5/232* (2006.01)
*H04N 5/225* (2006.01)
(Continued)

(52) U.S. Cl.
CPC ....... *H04N 5/23212* (2013.01); *G01C 15/002* (2013.01); *G02B 7/36* (2013.01);
(Continued)

(58) Field of Classification Search
CPC .......... G06T 7/08; G01C 15/002; G02B 7/36; H04N 5/2353
See application file for complete search history.

(56) References Cited

U.S. PATENT DOCUMENTS

| 4,423,934 A * | 1/1984 | Lambeth ................ G03B 43/00 |
|---|---|---|
| | | 396/213 |
| 5,923,468 A | 7/1999 | Tsuda et al. |
| | (Continued) | |

FOREIGN PATENT DOCUMENTS

| DE | 197 27 988 A1 | 1/1998 |
|---|---|---|
| DE | 199 49 580 B4 | 3/2007 |
| | (Continued) | |

OTHER PUBLICATIONS

Extended European Search Report dated Mar. 17, 2015 as received in Application No. 14185215.2.

*Primary Examiner* — Luke Ratcliffe
(74) *Attorney, Agent, or Firm* — Maschoff Brennan

(57) ABSTRACT

Surveying apparatus such as, for example, a video theodolite or video tachymeter, is disclosed. In some embodiments, the surveying apparatus may include a base, a support pivotable about a first axis relative to the base, a targeting unit pivotable about a second axis relative to the support and comprising a telescope optical unit comprising at least one objective and a motorized-adjustable focusing optical unit and also an eyepiece and/or a camera chip for recording an image through the objective, goniometers for measuring pivoting positions of the support and the targeting unit, an electro-optical distance measuring device, an evaluation and control unit, which provides a calibrated autofocusing functionality for automatically setting the focusing optical unit in a manner dependent on a target distance measured by the distance measuring device and contains for this stored calibration coefficients with regard to focusing optical unit positions to be set in a target-distance-dependent manner.

20 Claims, 8 Drawing Sheets

(51) Int. Cl.
    *G01C 15/00*     (2006.01)
    *G02B 7/36*     (2006.01)
    *G06T 7/80*     (2017.01)
    *G01C 1/04*     (2006.01)

(52) U.S. Cl.
    CPC ............ *G06T 7/80* (2017.01); *H04N 5/2253* (2013.01); *H04N 5/2257* (2013.01); *H04N 5/23293* (2013.01); *H04N 5/23296* (2013.01); *G01C 1/04* (2013.01)

(56) References Cited

U.S. PATENT DOCUMENTS

| | | |
|---|---|---|
| 6,433,858 B1 | 8/2002 | Suzuki |
| 6,504,602 B1 | 1/2003 | Hinderling |
| 7,583,373 B2 | 9/2009 | Schwarz |
| 2011/0134308 A1* | 6/2011 | Arnz .................... G02B 21/245 |
| | | 348/345 |

FOREIGN PATENT DOCUMENTS

| | | |
|---|---|---|
| EP | 1 081 459 B1 | 6/2002 |
| EP | 1 607 766 A1 | 12/2005 |
| EP | 1 686 350 A1 | 8/2006 |
| WO | 2013/080554 A1 | 6/2013 |

\* cited by examiner

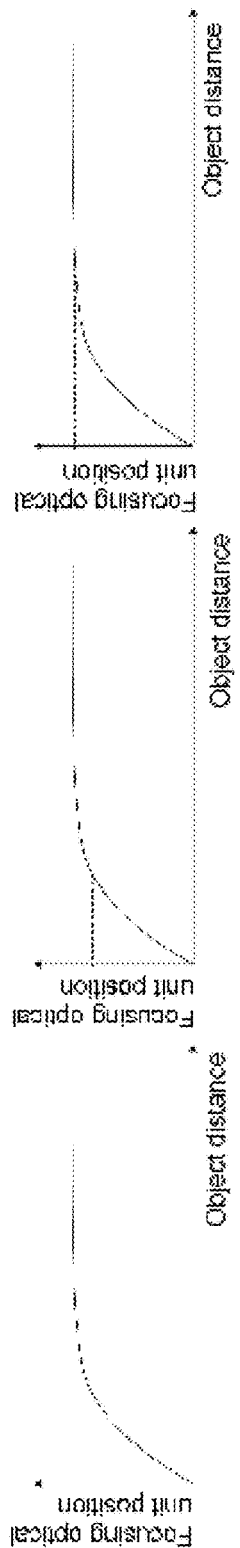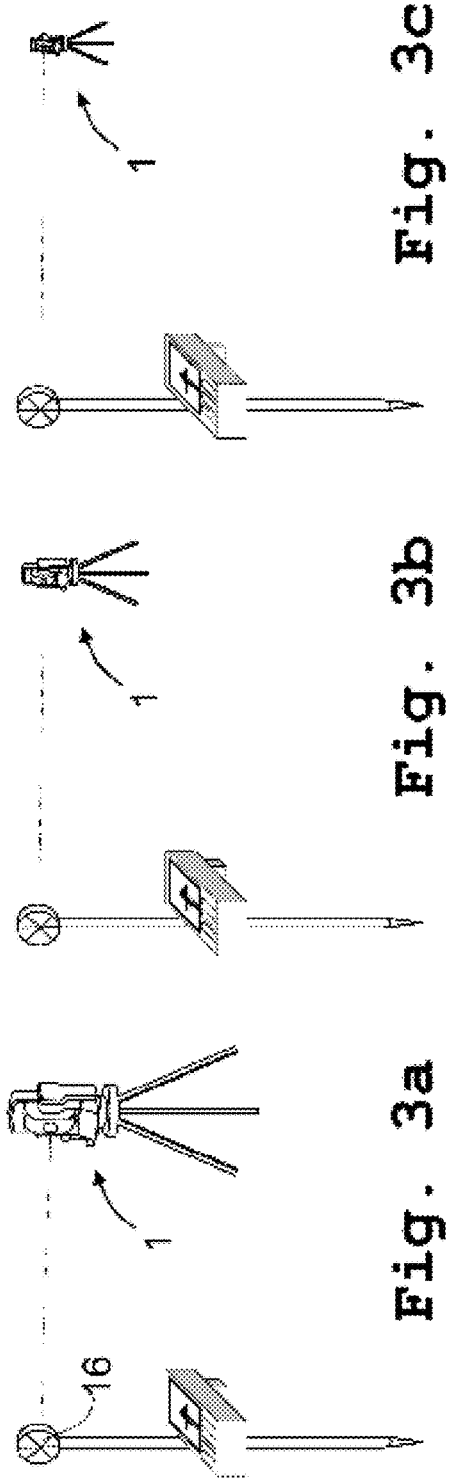
Fig. 3a Fig. 3b Fig. 3c

SURVEYING APPARATUS WITH FUNCTION FOR CALIBRATING FOCUSING OPTICAL UNIT POSITIONS TO BE SET IN A DISTANCE-DEPENDENT MANNER

FIELD OF THE INVENTION

The invention relates to a surveying apparatus comprising a coaxial camera integrated in the targeting unit, in particular a video theodolite or a video tachymeter.

BACKGROUND

For surveying a target point, a multiplicity of geodetic methods and geodetic apparatuses have been known since ancient times. In this case, distance and angle from a measuring apparatus to the target point to be surveyed are recorded and, in particular, the location of the measuring apparatus together with reference points possibly present are detected as spatial standard data.

One generally known example of such surveying apparatuses or geodetic apparatuses is a theodolite, a tachymeter or a total station, which is also designated as electronic tachymeter or computer tachymeter. One such geodetic measuring device from the prior art is described in the publication document EP 1 686 350, for example. Such apparatuses have electrical-sensor-based angle and distance measuring functions that permit direction and distance to be determined with respect to a selected target. In this case, the angle and distance variables are determined in the internal reference system of the apparatus and, if appropriate, also have to be combined with an external reference system for absolute position determination.

Modern total stations have microprocessors for digital further processing and storage of detected measurement data. The apparatuses generally have a compact and integrated design, wherein coaxial distance measuring systems and also angle measuring elements, computing, control and storage units are usually integrated in an apparatus. Depending on the expansion stage of the total station, means for motorization of the targeting optical unit, for reflectorless distance measurement, for automatic target seeking and target tracking and for remote control of the entire apparatus are integrated. Total stations known from the prior art furthermore have a radio data interface for setting up a radio link to external peripheral components such as e.g. a data acquisition apparatus, which can be designed, in particular, as a handheld data logger, field computer, notebook, minicomputer or PDA. By means of the data interface, it is possible to output measurement data acquired and stored by the total station for external further processing, to read externally acquired measurement data for storage and/or further processing into the total station, to input or output remote control signals for remote control of the total station or a further external component in particular in mobile use in the field, and to transfer control software into the total station.

Depending on the embodiment of the target point to be surveyed, the measurement accuracy achievable during the surveying process varies. If the target point is constituted for example by a target reflector designed specifically for surveying—such as an all-round prism—then it is possible to achieve significantly more accurate measurement results than in the case of a reflectorless measurement for example with respect to a point to be surveyed on a house wall. This is owing to the fact, inter alia, that the emitted optical measurement beam has a planar beam cross section rather than a punctiform beam cross section and, consequently, not only measurement radiation scattered at the target point that is actually to be surveyed is received, but also that from points in the immediate field of view surroundings of the target point which are likewise impinged on by the measurement radiation. By way of example, the roughness of the surface of the point to be surveyed influences the accuracies of reflectorless measurements in a known way.

For sighting or targeting a target point to be surveyed, surveying apparatuses of the generic type have a targeting device (such as a telescope). In one simple embodiment variant, the sighting device is embodied for example as a telescopic sight. Modern apparatuses can additionally have a camera for detecting an image, said camera being integrated into the telescopic sight, wherein the detected image can be displayed in particular as a live image on a display of the total station and/or a display of the peripheral apparatus—such as a data logger—used for remote control.

The coaxial camera (e.g. having a CCD or CMOS area sensor) provided in addition to the direct viewing channel can be arranged in a further image plane provided in the telescope optical unit, for which purpose a coupling-out of a partial light beam via a beam splitter can be provided, such that an image is recordable through the objective by means of the camera.

The optical system or the optical viewing channel of the targeting device contains in particular an objective lens group, a focusing lens group (focusing optical unit) and an eyepiece, which are arranged in this order from the object side. In this case, the focusing optical unit has a position measuring device and a position transmitter (motor).

A prerequisite for accurate sighting of the target is the sharp imaging of the field of view both on the display of the integrated camera and at the eyepiece of the telescope.

In one very simple embodiment, the focusing can be carried out by means of a manual focus—for example an adjusting screw for altering the position of the focusing optical unit. The manual focus, i.e. the manually settable position of the focusing optical unit, is always dependent on the personal sharpness perception of the user and on the observation means (e.g. eyepiece, camera display).

The camera of the sighting device can therefore have an autofocus unit, wherein the adjustment of the focusing optical unit is carried out e.g. by servomotors and is controlled e.g. with the aid of a contrast assessment on a specific array of a CMOS sensor or by means of a phase comparison. Automatic focusing devices for telescopic sights of geodetic apparatuses are known e.g. from DE 19710722, DE 19926706 or DE 19949580. The camera autofocus functions with an evaluation of the light beams arriving on the camera sensor. In the case of a contrast-based autofocus, a position of the focusing optical unit is derived with the contrast maximum found.

In addition—in a technologically simplifying manner—in the context of a distance-based autofocusing functionality, the position of the focusing optical unit can be set depending on the object distance measured by means of an optoelectronic distance measuring device such that a sharp object image arises on the camera sensor or an optical element with targeting marking (in particular reticle or graticule, or plate with cross-hair marking and line markings) arranged in the focusing plane. Said optical element with the image generated in said plane can then be viewed through the eyepiece. During the distance-based autofocusing, a distance measured by the optoelectronic distance measuring device is translated directly into a position of the focusing optical unit. This is done e.g. with the aid of a look-up table, a diagram or a curve in which the correlation between target distances and focusing optical unit positions to be set are stored.

In the surveying apparatus, an additional separate transmitting and receiving channel branch can be provided for the coaxial electronic distance measurement. Moreover, conventional surveying apparatuses in the meantime have an automatic target tracking function (ATR: "Automatic Target Recognition"), for which a further separate ATR light source—e.g. a multimode fiber output, which emits light having a further defined wavelength—and also a specific ATR camera sensor are additionally integrated in the telescope.

By way of example, the construction of generic telescopic sights of geodetic apparatuses is disclosed in the publication documents EP 1 081 459 or EP 1 662 278.

The high complexity of the telescope necessitates a high outlay for the necessary high-precision mounting and alignment of the optical components, which can comprise lenses, prisms and beam splitters. Therefore, an externally controlled, simple calibration is carried out during production, such that an identically sharp image can be seen at the direct-view viewfinder and also on the display—after focusing on the same target firstly on the basis of the manual focus and secondly on the basis of the camera autofocus and/or distance autofocus.

In the context of production, a standardized autofocus reference curve stored on the basis of e.g. polynomial coefficients is used for the target-distance-dependent autofocusing function, which reference curve according to experience or as proven statistically in the majority of apparatuses leads to a best possible focusing result. Said curve assigns the target distance measurable by the optoelectronic distance measuring device to the focusing optical unit position to be set. With a small number of calibration measures, for each apparatus an apparatus-specific focus offset possibly present is determined and then computed as overall offset with the autofocus reference curve.

However, such errors eliminated by the manufacturing calibration do not remain stable over the course of time. In this regard, they are influenced for example by physical vibration (for instance during transport), by temperature influences or by other material properties that change in a time-dictated manner. One possible consequence of this is that after the focusing by means of the distance measuring device or after the focusing by means of the autofocus of the camera either only the image at the direct-view viewfinder of the telescope or only the image on the camera display, or neither of the two images, is represented sharply. Further time expenditure is then necessary in order, by manual refocusing by means of the actuating wheel of the focusing optical unit, to obtain a sharp image either at the direct-view viewfinder of the telescope or on the electronic viewfinder or the display of the camera.

SUMMARY

Some embodiments of the invention may provide a recalibration functionality for a surveying apparatus which simply and rapidly renews the calibration coefficients that were stored during the factory calibration and have become inconsistent or inaccurate with regard to the focusing optical unit positions over time and/or under specific influences (e.g. vibrations), such that focusing errors are avoided during the target-distance-dependent autofocusing.

Some embodiments of the invention may eliminate a focusing error instigated by the same causes during the camera-controlled autofocusing.

The invention provides a recalibration functionality which enables the user to adapt or renew the target-distance-dependent autofocus reference curve with the aid of the camera autofocus and/or the manual focus on the basis of a specific trial measurement sequence carried out under the management of apparatus software. In precisely this way, the camera autofocus can also be corrected with the aid of the manual focus. The advantage of such a calibration is that the user can calibrate the respective autofocus system individually in the field, without having to rely on a specific calibration environment or having to take the surveying apparatus to the service center for this purpose.

As required, therefore, the implementation of such a recalibration makes it possible to ensure at any time that, as a result of the distance-based autofocusing, a sharp image is available both at the eyepiece and on the camera display, or that the camera autofocus makes a sharp image available at least in the camera sensor plane. This process can be carried out either regularly in the context of a recurring check or as necessary in order to eliminate a sharpness error that has already been identified.

Since the deviations from a ideal curve are relevant particularly in the near and medium-distance focusing range, the support points to be measured for a new setpoint curve should be concentrated particularly in this range for a better result. Therefore, e.g. the calibration apparatus software can instruct the user to sight objects for the recalibration which are situated at such a distance from the surveying apparatus, which describe an ideal reference curve mathematically in the most characteristic way.

In one embodiment of the invention, in a first step the user is requested to sight a target and to focus on said target at least once using a second focusing means, such as e.g. camera autofocus or manual focusing. Second focusing means are any focusing means that differ from the distance-dependent autofocus. The sighted targets can be artificial as well as natural targets.

After the manual focusing, the user—e.g. by means of a button, a touch command on the display or a contactless gesture—in a second step gives the surveying apparatus the command to store the currently prevailing focusing optical unit position as that position at which the desired setpoint sharpness is attained. Simultaneously or sequentially with respect thereto, the distance to the sighted target is measured by the optoelectronic distance measuring device. An embodiment of the invention is also conceivable in which firstly a distance measurement and then the focusing on the target with subsequent determination of the focusing optical unit position are carried out.

The focusing optical unit position detected during the focusing by the second focusing means is stored and entered in relation to the detected target distances, e.g. into a look-up table or into a curve, wherein e.g. a respective curve exists especially for the respective focusing method. In order to detect a desired standard deviation, the determinations of the focusing optical unit positions can be repeated for example multiply one after another or by means of different focusing methods, in order then to be stored as the result of a statistical evaluation. The statistical evaluation firstly gives the user an indicator of the quality of the field calibration procedure and secondly serves as a termination criterion for the case where, for example, an inexperienced user performs the calibration process and obtains widely fluctuating results in so doing.

Once this sequence of steps has been completed on the first target, the same procedure is carried out on further targets situated at a different distance from the surveying apparatus relative to the first target. Overall, N sequences of steps are carried out, wherein N is greater than or equal to two. Therefore, N measurement points are detected at N targets, with which a focus curve is created, e.g. by polynomial approximation.

On account of manufacturing inaccuracies and/or physical environmental influences, differences—albeit very small ones—with regard to the focusing optical unit positions always arise at the surveying apparatus if focusing on a defined target is carried out in different ways. These types of focusing are, for example, a distance-dependent autofocus, a camera-controlled autofocus or a manual focus, in the case of which the user has to judge the sharpness of the image, the subjective sharpness perception of a user also being relevant.

Since modern video total stations can also have, in addition to the optical telescope direct-view viewfinder (eyepiece), an electronic viewfinder—e.g. in the form of a display or an electro-optical viewer (EOV)—which reproduces the image projected at the camera sensor, there are thus potentially at least two different observation possibilities for the manual focus. Likewise on account of manufacturing inaccuracies and/or physical environmental influences, differences in sharpness can arise as a result of minimal path differences in the beam path. When considered the other way round, therefore, a difference in the curves can be manifested in such a way that images of different sharpnesses are projected at the same focusing optical unit position, i.e. on to the camera sensor and the eyepiece ground-glass screen. In this case, the path length of the optical path from the target object to be focused to the camera sensor is not identical to that path length as far as the eyepiece ground-glass screen, which can be governed for instance by a beam path branched off for the camera system.

Therefore, if the camera autofocus for example functions correctly—i.e. a sharp image is displayed on the display after a camera autofocusing—then during focusing of the same target the focusing optical unit positions of the curve of the manual focus (viewed on the LCD) correspond to the focusing optical unit positions attained by the camera autofocus. In this case, the image visible at the eyepiece would then simultaneously be unsharp as a result of said path difference in the beam paths. The curve of the manual focus (viewed at the eyepiece) would then deviate from the curve of the manual focus (viewed at the LCD). The image visible at the eyepiece would then likewise be unsharp after a camera autofocusing.

Consequently, there is a dedicated curve or a dedicated diagram for each observation method for the manual focusing. These curves are determined such that the focusing positions of the focusing optical unit are recorded in a target-distance-dependent manner. The curve of the distance-dependent autofocus differs from all other curves in so far as it has to be known a priori for the functionality thereof. From the curve of the distance-dependent autofocus, data which are correlated in advance on the basis of input data (measured distances) are inferred (focusing optical unit positions). The curves of the camera autofocus and of the manual focusings (with a different observation method in each case) are recorded a posteriori and per se do not serve for functional implementation, but rather only for evaluation retrospectively.

If, after a distance-dependent autofocusing, the image at the optical direct-view viewfinder of the telescope and the image on the display of the camera, with regard to the focusing optical unit, are unsharp by the same positional absolute value (with the same sign)—that would mean that the two curves of the manual focus (eyepiece, LCD) are at least sufficiently identical—then a curve correction of the distance-dependent autofocus system can be oriented to the sharpness curve of one of the two or else both manual focuses.

If, after a distance-dependent autofocusing, by contrast, the image at at least one of the two observation possibilities—LCD and eyepiece—is unsharp and the two associated curves of the manual focuses are not identical, then a correction of the curve of the distance-dependent autofocus can be oriented to such a curve to be calculated which results computationally from the two sharpness curves of the manual focuses, e.g. by averaging or statistically weighted averaging. By virtue of the fact that the then corrected autofocus curve, during its entire profile, in terms of absolute value, has the same deviation (with respective opposite signs) in each case with respect to both the determined curves of the manual focuses, what is achieved is that both observation methods display a sufficiently sharp image after distance autofocus has been carried out.

Particularly if that optical unit of the camera which is ultimately responsible for determining the focusing optical unit positions is not the camera sensor itself, differences in terms of length and thus unsharpness can occur at the camera sensor. This is the case e.g. for autofocus methods which utilize a branched beam path for a phase comparison (redundant).

If the camera autofocus does not function correctly, therefore, a further problem can emerge from the autofocusing unit of the camera. If, after camera autofocusing has been carried out, the image that is visible on the LCD ergo the image projected on to the camera sensor, is unsharp, then the camera autofocus requires a correction in order to allow sharp images to be recorded and displayed. This problem can be instigated by path differences in the beam paths if a beam path branched off once again by a beam splitter within the camera system is involved specially for the autofocusing, for example realized by a phase comparison autofocus. This problem, too, can be eliminated according to the invention.

Such a correction of the camera autofocusing is necessary particularly if video total stations known from the prior art store images that have been recorded by the camera and focused by means of the camera autofocus together with distance measurement data. A regular calibration of the focusing optical unit positions obtained by means of the camera autofocus has the effect that these photographs to be stored are always sharp. Depending on the focusing optical unit position set after camera autofocusing has been carried out, a corrective offset is subtracted therefrom or added thereto. With the mutually different curves of the camera autofocus and that of the manual focus (viewed at the LCD), a corrective shift is determined, e.g. also by averaging or statistically weighted averaging. A correction of the camera autofocusing takes place in such a way that a difference profile is formed and the latter is taken into account from then on in a camera-controlled autofocusing in a position-dependent manner in relation to the focusing optical unit.

In a further embodiment of the invention, therefore, in a first step the user is requested to sight a target and to perform both a camera autofocusing and a manual focusing on said target at least once in each case, the order of these two focusing methods being unimportant. After camera autofocusing has been carried out, the current focusing optical unit position is automatically detected and stored. After manual focusing has been carried out, the current focusing optical unit position is detected and stored in response to a command from the user. Said command can be given to the surveying apparatus for example via a button, a touch display, a voice detector or a gesture recognition system. In a second step, the difference in the detected focusing optical unit positions is calculated by the evaluation and control unit and a future correction of said difference is offered to the user. If the user gives an affirmative reply to the query on the operating control display, from then on after a camera autofocusing the focusing optical unit position is automatically shifted subsequently by the difference determined. For determining this focusing optical unit position difference, said first step can be repeated either on the basis of the same target or on the basis of different targets, wherein the differences determined are then averaged or averaged in a weighted manner.

In the case of a typical one-man surveying task with a target reflector, a surveying apparatus, in particular a total station, is set up for example in the terrain. The user moves a handheld surveying rod bearing a target reflector to a target point to be surveyed, whereupon the position of the target reflector and thus of the target point can be determined as follows. The control of the surveying apparatus is carried out in particular under remote control by the user carrying the surveying rod, by means of a data logger connected to the surveying apparatus by a radio link. In this case, the data logger can be fitted to the surveying rod equipped with the target reflector or can additionally be handheld by the user alongside the surveying rod. In this case, the sighting of the target can be carried out using a live image which can be displayed to the user in the display of the data logger and which is provided by the camera arranged in the telescopic sight as sighting device of the surveying apparatus. With the aid of this video stream, the software of the data logger can lead the user to the locations situated at distances from the surveying apparatus that are required for the calibration.

In order to enable the recalibration functionality for the distance-dependent autofocus in the case of one-man surveying, too, the method described above can be carried out under remote control by the data logger connected to the surveying apparatus wirelessly. If the user is therefore situated at the position provided by the software of the data logger, it is possible, in a manner that can be initiated remotely by the data logger, to carry out firstly a target-distance-dependent autofocusing of the surveying apparatus on the target positioned by the user, then a camera-based autofocusing and subsequently a comparison between the two focusing optical unit positions attained in the process, or between focusing optical unit positions attained previously by manual focusing and the focusing optical unit positions attained by the two autofocusing methods mentioned. The comparison can be followed—also under remote control by e.g. a remotely situated supervisory center—by either a check or a corrective adaptation of the autofocus systems. In this case, the remotely controlling computer of the supervisory center is connected to the surveying apparatus by means of wireless technologies, such as the Internet or radio, and is able to fully control the recalibration.

Assuming an accurate or sufficiently precise camera autofocusing with regard to the image projected at the sensor and at the ground-glass screen of the telescope, then a fully automatic recalibration mode can be provided for the controlling software—irrespective of whether apparatus-internal or apparatus-external. In one process it is then possible, in a manner initiated by a user or by the surveying apparatus itself, in particular automatically, with the sighting of a target remaining the same, to initiate firstly an optoelectronic distance measurement and then a camera-controlled autofocusing. The focusing optical unit positions respectively determined in this case are compared with the corresponding focusing optical unit positions stored for the distance-dependent autofocus. The reference curve of the distance-based autofocus system is then corrected, if appropriate, on the basis of the differences determined. The sighting or finding of the targets situated at the required distances can also be carried out by the user or in particular automatically by the surveying apparatus itself. The automatic target finding can be carried out e.g. on the basis of focusing optical unit positions preset in a defined manner, wherein during the systematic search (adjustment of the support and the targeting unit) with the camera autofocus a check is made continuously to ascertain whether the object currently sighted is focused in the field of view. If sighting is carried out on the basis of this method, an optoelectronic distance measurement is carried out and the distance measured thereby in correlation with the predefined focusing optical unit position is added to the measurement data set. On the basis of an evaluation of the measurement data set with regard to coherence of the distances and actual positions of the focusing optical unit that are respectively assigned to one another with the focusing optical unit positions to be set in a target-distance-dependent manner in the context of the autofocusing functionality, the stored calibration coefficients can then be checked and in particular renewed, if appropriate.

In order to ensure a constant accuracy of the distance-based autofocus, the user can define an interval in which—including during a regular surveying task—a recalibration is carried out automatically or at least a reminder of such a calibration is given. The deviations are calculated in the background and either corrected automatically or indicated by means of a warning in the user interface. Alternatively, it is also possible firstly to issue a warning about a defect with regard to deviations of the focusing optical unit positions if a defined threshold was reached. If this threshold was detected as having a magnitude uncalibratable with the recalibration functionality according to the invention, the user is instructed to take the surveying apparatus to customer service.

BRIEF DESCRIPTION OF THE DRAWINGS

The device according to the invention is described in greater detail purely by way of example below on the basis of concrete exemplary embodiments illustrated schematically in the drawings, further advantages of the invention also being discussed. In the figures specifically:

FIGS. 3a,b,c show the correlation between object distance and focusing optical unit position in the curve diagram and, for clarification, the illustration of a surveying apparatus with reflector bar at the corresponding distances;

DETAILED DESCRIPTION

Figure 1:
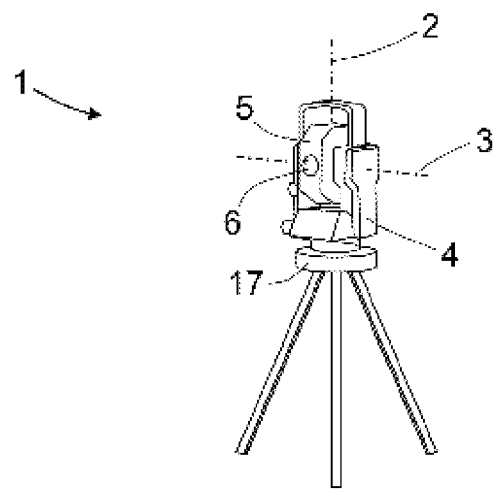
FIG. 1 shows the diagrammatic illustration of a surveying apparatus according to the invention.

FIG. 1 shows the surveying apparatus 1 according to the invention comprising the support 4, which is mounted on the base 17 and is pivotable about the first axis 2, and the targeting unit 5, which is pivotable relative to the support 4 about the second axis 3 and which contains the components of the telescope optical unit, in particular the objective 6.

Figure 2:
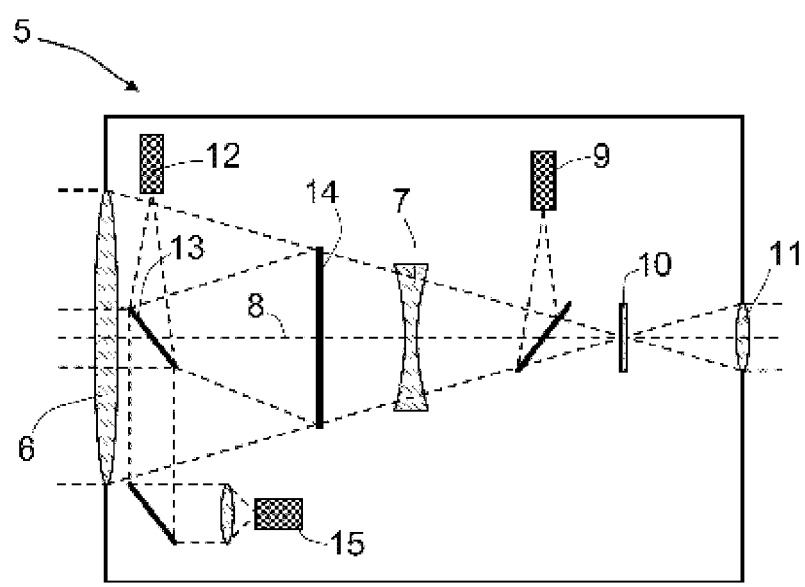
FIG. 2 shows the optical beam path in a surveying apparatus according to the invention.

FIG. 2 shows the schematic illustration of a targeting unit 5 with telescope optical unit, such as is also already sufficiently known in the prior art. The targeting unit 5 has the objective 6, the motorized-adjustable focusing optical unit 7, a camera sensor 9—aligned coaxially with respect to the optical axis 8 of the targeting unit 5—for detecting a camera image, a ground-glass screen 10 and also an eyepiece 11.

In this case, the camera sensor 9 is connected to an electronic graphics processor for generating a display image from the detected camera image. The graphics processor is in turn connected to a display or electro-optical viewfinder, such that the generated display image can be represented with the aid of the display.

The objective 6 can e.g. also be constructed with a plurality of lenses or be embodied in a panfocal fashion—with a variable field of view.

A laser source 12 is provided for the distance measurement and the automatic target seeking function, wherein the laser beam is correspondingly coupled in and out with the aid of a beam combiner 13—such as, for example, a beam splitter surface having a dichroic coating.

The laser source 12 can emit e.g. laser beams in the visual range—for instance having a wavelength of 630 nm—such that a measurement spot is visible on the target object.

In this case, a beam coupling-out unit 14 can be present between the beam combiner 13 and the focusing optical unit 7 and couples out the laser beams, whereas it advantageously transmits the visual spectrum with as far as possible no obstruction. The coupled-out laser beams are directed through the beam combiner 13 on to a receiver 15.

FIGS. 3a, 3b and 3c show identical diagrams in which the focusing optical unit position required for focusing is plotted as a function of the distance between surveying apparatus 1 and object 16. In accordance with the diagrammatic clarifications illustrated underneath, the respective actual correlations between focusing optical unit position and object distance are shown by the dashed lines in the diagrams.

Figure 4:
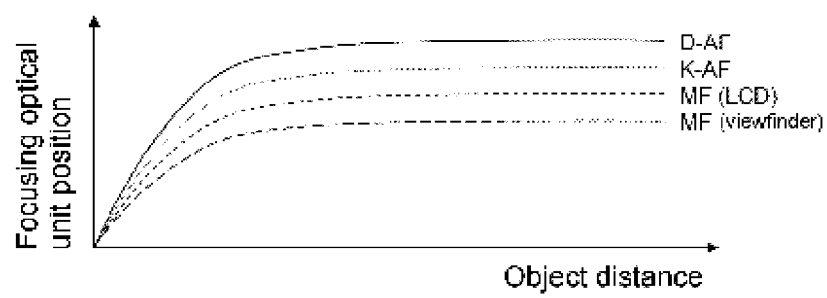
FIG. 4 shows, as possible focus curves, that of the distance autofocus D-AF, that of the camera autofocus K-AF, that of the manual focus viewed at the LCD MF (LCD) and that of the manual focus viewed at the viewfinder MF (viewfinder)

FIG. 4 shows possible focus curves, wherein the curve D-AF plots by way of example the calibratable focusing points of the distance-dependent autofocusing functionality. The curve K-AF shows by way of example the focusing points of the camera autofocusing functionality that are determinable only a posteriori and with the aid of the distance measuring device. The curves MF (in each case LCD and viewfinder) show by way of example the focusing positions of the focusing optical unit as a function of the object distance, said focusing positions being attained after manual focusing—firstly in a manner assessed evidently by eye at the display of the camera (LCD) and secondly in a manner assessed evidently by eye at the eyepiece (viewfinder).

Figure 5:
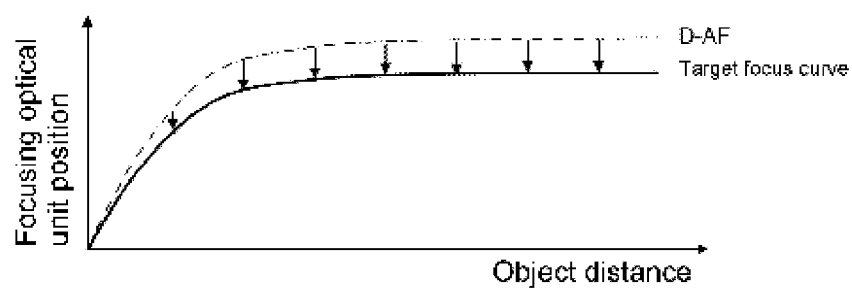
FIG. 5 shows the correction of the curve of the distance autofocus D-AF by shifting with respect to a target focus curve.

FIG. 5 shows a simple curve correction for the distance-dependent autofocusing functionality in the form of a shift or replacement. In this case, the stored calibration coefficients are renewed, such that the curve D-AF is shifted to a target focus curve or is replaced by the latter.

Figure 6:
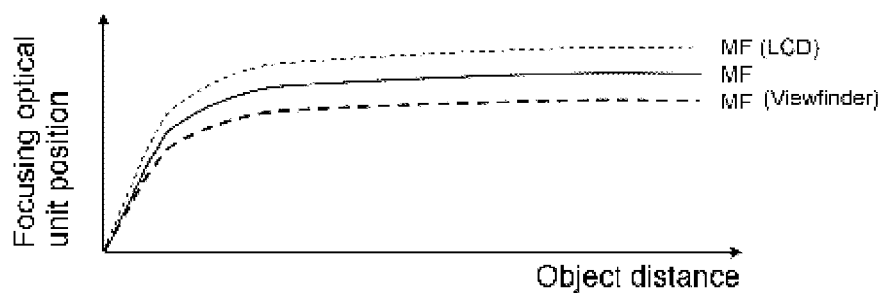
FIG. 6 shows the averaging of two curves of the manual focus (firstly viewed at the LCD, and secondly viewed at the viewfinder)

FIG. 6 shows a curve MF of the manual focus that is generated by averaging and is to be used for example as target focus curve for a curve correction or for a further averaging. This resulting curve MF is always at the same distance from the individual curves MF (LCD) and MF (viewfinder) and is distinguished by the fact that at the focusing optical unit positions to be set in a distance-dependent manner the image on the camera display and the image at the eyepiece have the same degree of sharpness.

Figure 7:
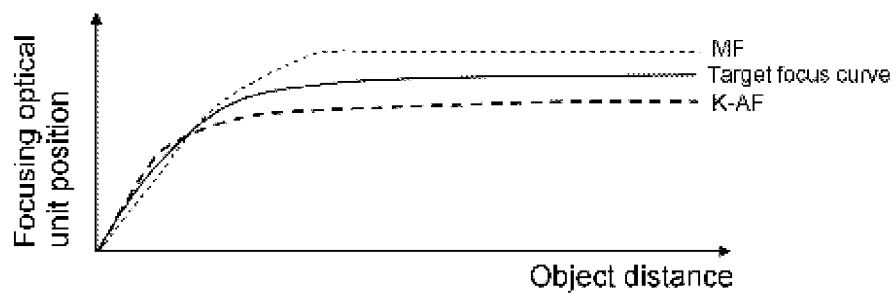
FIG. 7 shows the averaging of a curve of the manual focus and a curve of the camera autofocus with respect to a target focus curve.

FIG. 7 shows the averaging of a focus curve of the manual focus MF with the focus curve of the camera autofocus function K-AF. As the resultant curve here, a target focus curve emerges which can in turn be used for the recalibration of the curve D-AF for example in accordance with FIG. 5.

Figure 8:
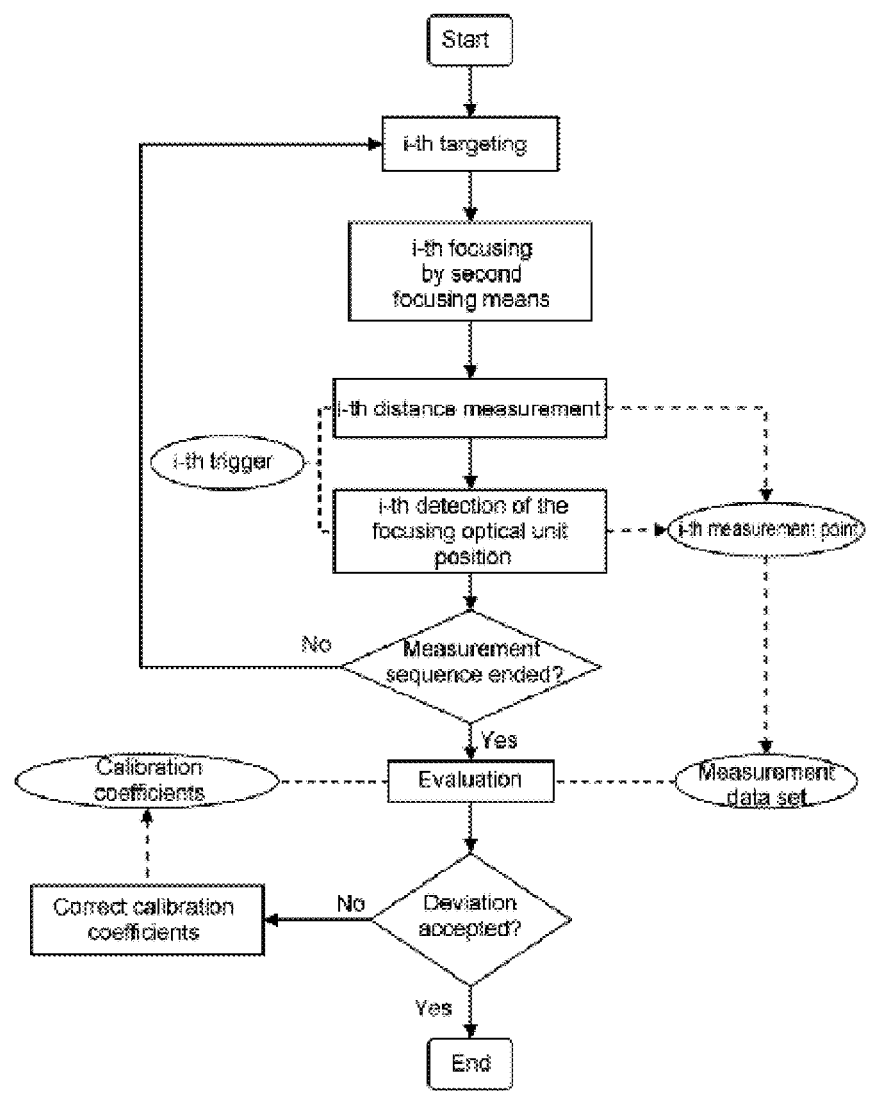
FIG. 8 shows the flow diagram of the recalibration function for the distance autofocus.

FIG. 8 shows the sequence of the recalibration functionality for the distance-dependent autofocusing function. For the recalibration functionality a sequence of N targetings—to be carried out progressively—of a respective i-th target, where i runs consecutively from one to N, with respective focusing performed via the second focusing means (e.g. K-AF or MF) and distance measurement is defined. The corresponding sequence information for this is stored in the evaluation and control unit. Upon reaching N passes, the measurement sequence is ended, for example, wherein N need not necessarily be defined in advance.

In the context of the recalibration functionality in a manner automatically controlled or carried out by the evaluation and control unit for every i-th of the N targetings in response to a respective i-th trigger, after targeting has been performed and focusing of the i-th target has been performed via the second focusing means, automatically an i-th distance is measured by the distance measuring device and an i-th actual position of the focusing optical unit is detected and, respectively assigned to one another, they are added to a measurement data set.

On the basis of an evaluation of the measurement data set with regard to coherence of the i-th distances and i-th actual positions of the focusing optical unit that are respectively assigned to one another with the focusing optical unit positions to be set in a target-distance-dependent manner in the context of the autofocusing functionality, the stored calibration coefficients are checked and in particular renewed, if appropriate.

Figure 9:
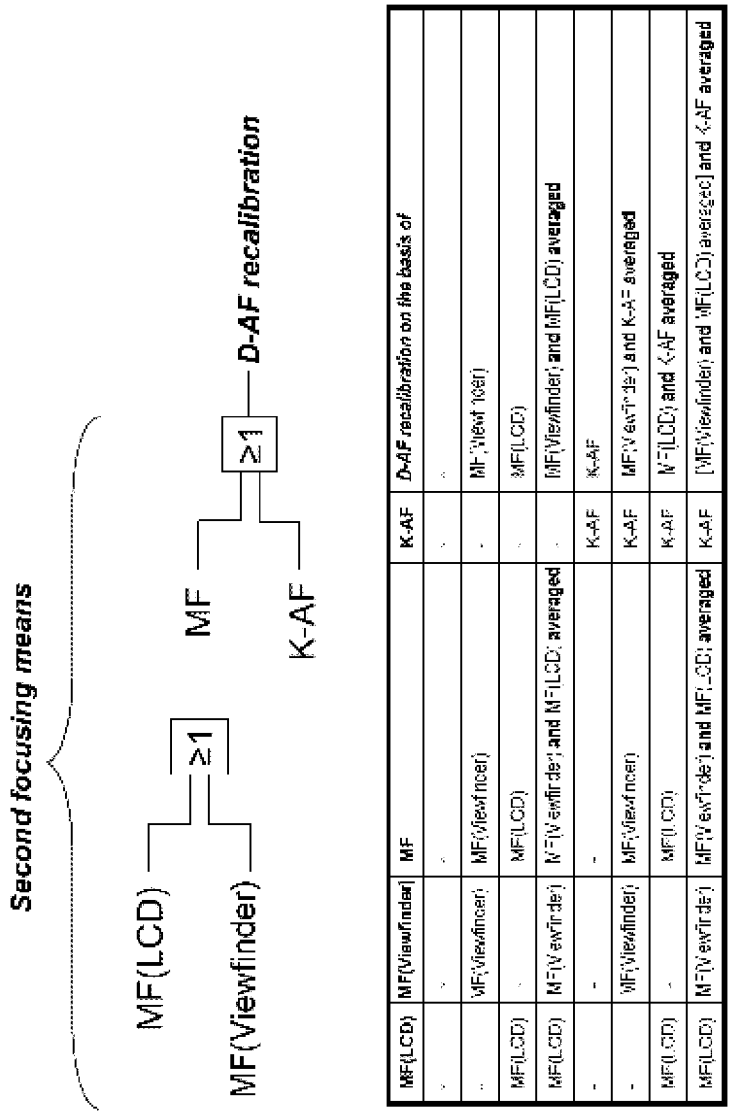
FIG. 9 shows the logical network of the recalibration function for the distance autofocus with truth table.

The logical network from FIG. 9 shows how the second focusing means can be used for the recalibration of the curve D-AF. The associated truth table is depicted for an overview of the possibilities. Accordingly, with the second focusing means illustrated in the logical network, there are seven calibration possibilities for the distance-dependent autofocusing functionality.

Figure 10:
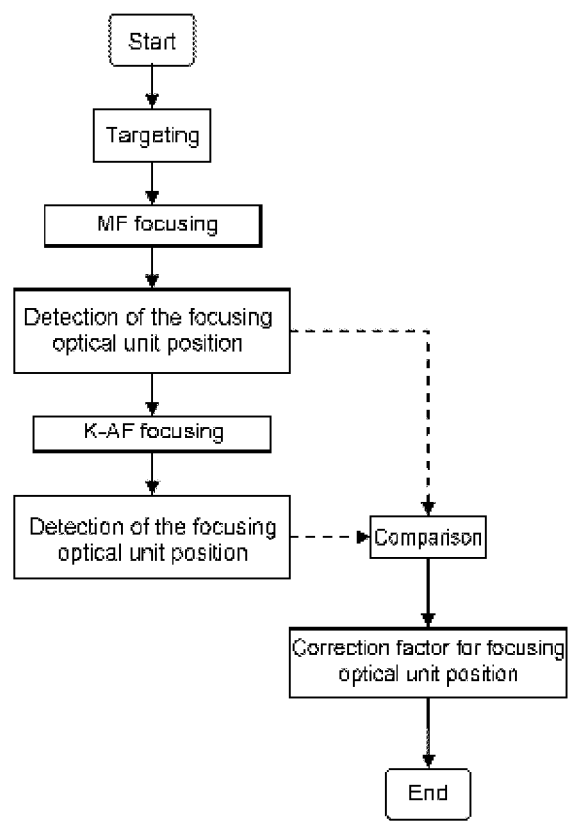
FIG. 10 shows the flow diagram of the correction function for the camera autofocus.

FIG. 10 shows the sequence of the correction functionality for the camera autofocusing function. In the context of the correction functionality after the targeting of a target a comparison can be made between the focusing optical unit position attained after a manual focusing and the focusing optical unit position attained after a camera autofocusing. The possibly determined difference in the focusing optical unit positions here (given the same focusing target) after subsequent camera autofocusings with regard to an automatic position correction of the focusing optical unit can be taken into account sweepingly over the entire position range, e.g. in the form of a correction factor.

Figure 11:
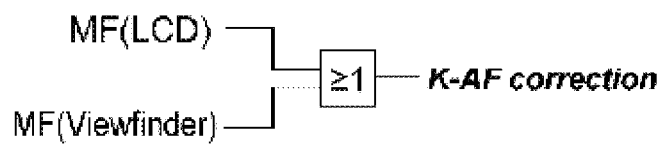
FIG. 11 shows the logical network of the correction function for the camera autofocus with truth table.

The logical network from FIG. 11 shows how the two manual focuses MF (LCD) and MF (viewfinder) can be used for the correction of the camera autofocusing function. The associated truth table is depicted for an overview of the possibilities. Accordingly, with the manual focusing methods illustrated in the logical network there are three correction possibilities for the camera autofocusing function.

Figure 12:
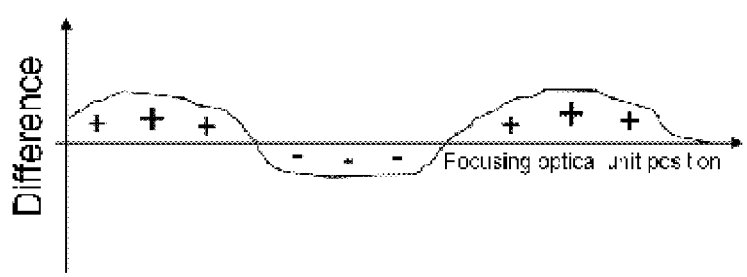
FIG. 12 shows the difference curve for the correction of the camera autofocus.

FIG. 12 shows a correction factor profile over the entire focusing optical unit position range. This profile can be generated e.g. by interpolation of N detected focusing optical unit position differences and can be used for the position correction of the focusing optical unit after camera autofocusing has been carried out. With the diagram, a supplement or a deduction with respect to each focusing optical unit position can accordingly be read. This profile can also be realized as a look-up table.

To the person skilled in the art it goes without saying that the various means for the recalibration of the target-distance-dependent autofocusing functionality can be combined with one another in an alternative or supplementary manner.

What is claimed is:

1. A surveying apparatus, comprising
a base,
a support pivotable about a first axis relative to the base,
a targeting unit pivotable about a second axis relative to the support and comprising a telescope optical unit—defining an optical beam path—comprising at least one objective and a motorized-adjustable focusing optical unit and also
an eyepiece and/or
a camera chip for recording an image through the objective,
goniometers for measuring pivoting positions of the support and the targeting unit,
an electro-optical distance measuring device,
an evaluation and control unit, which provides a calibrated autofocusing functionality for automatically setting the focusing optical unit in a manner dependent on a target distance measured by the distance measuring device and contains for this stored calibration coefficients with regard to focusing optical unit positions to be set in a target-distance-dependent manner, and
at least one second focusing means for focusing—independently of a distance measurable by the distance measuring device—a sighted target by adjusting the focusing optical unit, wherein:
a recalibration functionality for the target-distance-dependent autofocusing functionality, said recalibration functionality proceeding at least partly automatically and being provided for implementation in the field, wherein for the recalibration functionality a sequence of N, where N is greater than or equal to two, targetings—to be carried out progressively—of a respective i-th target, where i runs consecutively from one to N, with respective focusing performed via the second focusing means and distance measurement is defined and for this corresponding sequence information is stored in the evaluation and control unit,
and wherein in the context of the recalibration functionality in a manner automatically controlled or carried out by the evaluation and control unit
for every i-th of the N targetings in response to a respective i-th trigger, after targeting has been performed and focusing of the i-th target has been performed via the second focusing means, automatically an i-th distance is measured by the distance measuring device and an i-th actual position of the focusing optical unit is detected and, respectively assigned to one another, they are added to a measurement data set, and
automatically on the basis of an evaluation of the measurement data set with regard to coherence of the i-th distances and i-th actual positions of the focusing optical unit that are respectively assigned to one another with the focusing optical unit positions to be set in a target-distance-dependent manner in the context of the autofocusing functionality, the stored calibration coefficients are checked.

2. The surveying apparatus according to claim 1, wherein:
the surveying apparatus comprises a video theodolite or video tachymeter.

3. The surveying apparatus according to claim 1, wherein:
the calibration coefficients are renewed.

4. The surveying apparatus according to claim 1, wherein:
a display for displaying an image projected on the camera sensor.

5. The surveying apparatus according to claim 1, wherein:
an electro-optical viewer (EOV) for displaying an image projected on the camera sensor.

6. The surveying apparatus according to claim 1, wherein:
the second focusing means are designed for adjusting the focusing optical unit in a manner performed under manual control by a user, wherein the image sharpness is assessable evidently by eye by means of at least one observation possibility.

7. The surveying apparatus according to claim 1, with the presence of a camera chip for recording an image through the objective and the focusing optical unit, wherein:
the second focusing means are designed for automatic focusing according to the principle of edge contrast measurement, wherein the camera chip is used as an autofocus sensor for this purpose, or according to the principle of phase comparison.

8. The surveying apparatus according to claim 7, wherein:
the camera chip is used as an autofocus sensor with the use of line or cross sensors as an autofocus sensor.

9. The surveying apparatus according to claim 1, wherein:
a plurality of measurement data sets are computable with one another.

10. The surveying apparatus according to claim 1, wherein:
a plurality of measurement data sets are computable with one in a weighted fashion, for the evaluation.

11. The surveying apparatus according to claim 1, wherein:
the measurement data sets are calculated by interpolation by approximation achievable with polynomials with respect to reference curves such that an assigned focusing optical unit position is retrievable for every measurable target distance.

12. The surveying apparatus according to claim 1, wherein:

the measurement data sets are calculated by interpolation such that an assigned focusing optical unit position is retrievable for every measurable target distance.

13. The surveying apparatus according to claim 1, wherein:
the recalibration functionality is implementable from a remote control.

14. The surveying apparatus according to claim 1, wherein:
upon the overshooting of a defined absolute value threshold with regard to the deviation between the i-th distance and i-th actual position respectively assigned to one another with the focusing optical unit position to be set in a target-distance-dependent manner in the context of the autofocusing functionality, a warning message is reproducible and/or
upon the undershooting of said absolute value threshold, the deviation is automatically and simultaneously included calculationally in the calibration coefficients.

15. The surveying apparatus according to claim 1, with the presence of a camera chip for recording an image through the objective and the focusing optical unit, wherein:
the recalibration functionality is implementable fully automatically.

16. The surveying apparatus according to claim 1, with the presence of a camera chip for recording an image through the objective and the focusing optical unit, wherein:
the recalibration functionality is implementable fully automatically at regular time intervals independently.

17. The surveying apparatus comprising:
a base,
a support pivotable about a first axis relative to the base,
a targeting unit pivotable about a second axis relative to the support and comprising a telescope optical unit—defining an optical beam path—comprising at least one objective and a motorized-adjustable focusing optical unit and a manually adjustable focusing optical unit and also
an eyepiece and
a camera chip for recording an image through the objective,
goniometers for measuring pivoting positions of the support and the targeting unit,
an evaluation and control unit, by means of which the positions of the motorized-adjustable focusing optical unit are storable and computable,
a camera autofocusing function according to the principle of edge contrast measurement or according to the principle of phase comparison, and
a manual focusing means for adjusting the manually adjustable focusing unit in a manner performed under manual control by a user, wherein the image sharpness is assessable evidently by eye by means of at least one observation possibility, wherein:
a correction functionality for the camera autofocusing function, said correction functionality being provided for implementation in the field,
wherein in the context of the correction functionality after the targeting of a target
a comparison can be made between the focusing optical unit position attained after a manual focusing and the focusing optical unit position attained after a camera autofocusing,
and the possibly determined difference in the focusing optical unit positions after camera autofocusings with regard to an automatic position correction of the motorized-adjustable focusing optical unit can be taken into account sweepingly over the entire position range.

18. The surveying apparatus according to claim 17, wherein:
wherein the camera chip is used as an autofocus sensor for this purpose.

19. The surveying apparatus according to claim 17, wherein:
the autofocus function in occurs with the use of line or cross sensors as an autofocus sensor.

20. The surveying apparatus according to claim 17, wherein:
at N sighted targets at different distances from the measuring apparatus, N differences in the focusing optical unit positions are determined and these are calculated by interpolation to form difference curves, such that for each focusing optical unit position achievable by a camera autofocusing, an assigned difference is retrievable for position correction.

* * * * *